United States Patent [19]

Boulanger

[11] Patent Number: 5,227,227
[45] Date of Patent: Jul. 13, 1993

[54] NON-WOVEN FABRIC WITH A THERMALLY ACTIVATED ADHESIVE SURFACE, RESULTING PRODUCT AND APPLICATIONS THEREOF

[75] Inventor: Roger Boulanger, Ste-Julie, Canada

[73] Assignee: Johnson & Johnson Inc., Montreal, Canada

[21] Appl. No.: 550,258

[22] Filed: Jul. 9, 1990

[30] Foreign Application Priority Data

Mar. 5, 1990 [CA] Canada .................................. 2011515

[51] Int. Cl.$^5$ .............................................. D03D 3/00
[52] U.S. Cl. ...................................... 428/224; 428/131; 428/137; 428/138; 428/284; 428/287; 428/298; 428/299; 428/343
[58] Field of Search ............... 428/224, 284, 287, 298, 428/294, 137, 138, 131, 343

[56] References Cited

U.S. PATENT DOCUMENTS

| | | | |
|---|---|---|---|
| 2,862,251 | 12/1958 | Kalwartes | 428/131 |
| 3,033,721 | 5/1962 | Kalwartes | 428/131 |
| 3,081,501 | 3/1963 | Kalwartes | 19/161 |
| 3,787,932 | 1/1974 | Kalwartes | 19/161 |
| 4,002,801 | 1/1977 | Knechtges et al. | 428/474 |
| 4,824,507 | 4/1989 | D'Amico | 156/245 |

Primary Examiner—James J. Bell

[57] ABSTRACT

A three-dimensional non-woven fabric with a thermally activated adhesive surface well suited for use as a facing fabric for covering a fibrous mat. The fabric comprises two adjoining fiber layers, namely an adhesive layer including bond-forming fibers fusible at a predetermined temperature and a facing layer of fibers having a considerably higher melting temperature than the bond-forming fibers. The fibers of both layers are mechanically engaged one with another and are arranged flatwise in bundles interconnected at junctures by protuberant fiber packings disposed in a staggered relationship throughout the fabric. Bond-forming fibers are concentrated in the apex portions of the fiber packings to form the thermally activated adhesive surface. The invention also extends to a process for manufacturing the three-dimensional non-woven fabric, based on the so-called "rosebud" technique for producing foraminous webs. The invention further comprehends a molded fibrous mat article with a non-woven fabric facing layer, and a method for producing the article.

11 Claims, 4 Drawing Sheets

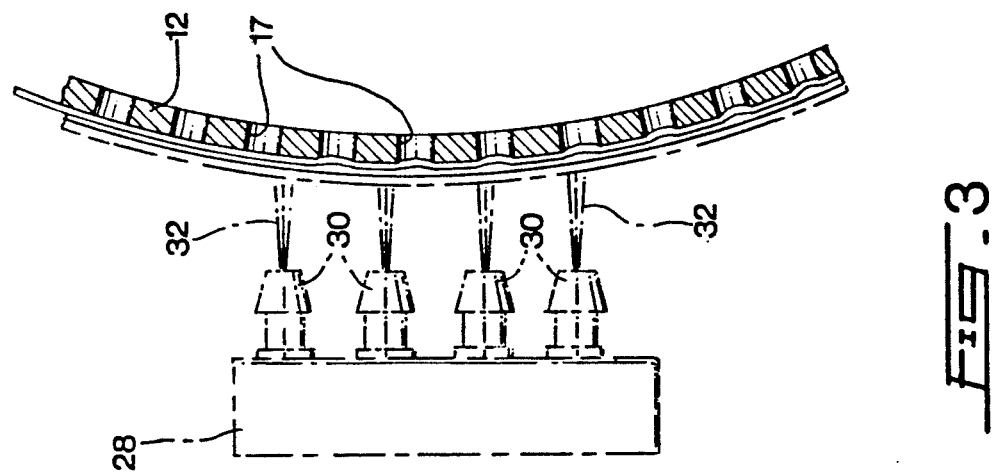
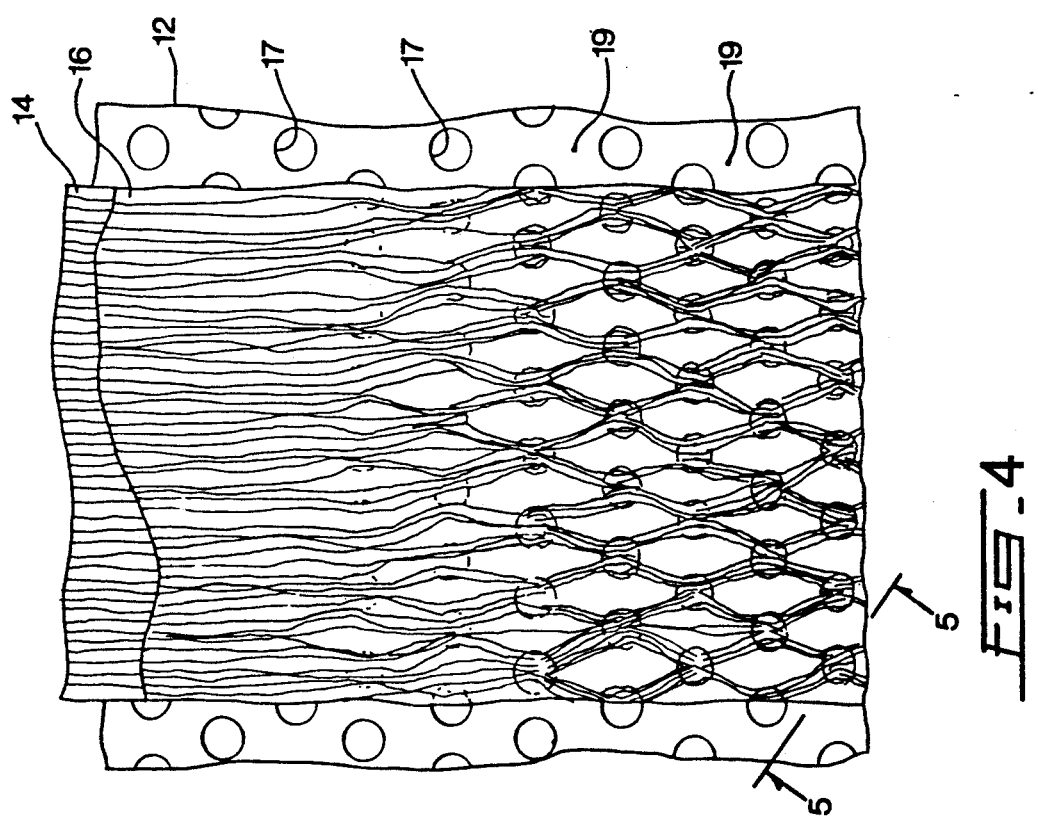

NON-WOVEN FABRIC WITH A THERMALLY ACTIVATED ADHESIVE SURFACE, RESULTING PRODUCT AND APPLICATIONS THEREOF

FIELD OF THE INVENTION

The present invention relates to a new non-woven fabric with a self-bonding surface well suited for use as a facing fabric for covering a fibrous mat, and to a method for producing the non-woven fabric. The invention also extends to a molded fibrous mat article to which is heat-sealed a layer of non-woven fabric and to a process for manufacturing the fibrous mat article.

DESCRIPTION OF THE PRIOR ART

Glass fibers mat is extensively used in various fields as a sound-deadening and thermally insulating medium. One example is the automotive industry where a glass fibers mat is applied to various sections of a vehicle cabin such as the floor-pan or the fire-wall to limit heat and noise penetration.

In a glass fibers mat, the individual fibers are relatively loosely retained to the mat network and consequently, small glass particles are released during the manipulation of the unfaced mat causing irritation problems to the user. Some manufacturers are trying to solve this problem by applying on the main surfaces of the fibrous mat facing layers of synthetic non-woven fabric which form a cladding preventing small glass particles to escape. In addition, the facing layers aesthetically improve the fibrous mat article.

Typically, the non-woven fabric is heat sealed to the fibrous mat in a mold which also cures and provides the mat with a desired shape. A typical set-up comprises a supply station feeding uncured fibrous mat toward the mold between two sheets of non-woven fabric. Immediately prior to the fabric sheets entering the mold, they pass through respective adhesive coating stations which apply a thermally activated adhesive in powder form thereon, which under the effect of heat generated in the mold fuses and bonds the fabric sheets to the mat.

The above described process has two main drawbacks. Firstly, the adhesive coating stations considerably increase the manufacturing cost of the final product. Secondly, the non-woven fabrics currently used do not have the required elongation capability to expand and follow the topography of the fibrous mat during the shaping process thereof in the mold. On high deformation parts, the non-woven fabric usually tears which obviously is undesirable.

It is known in the field to use a non-woven fabric with a thermally activated self-bonding surface which obviates the need of adhesive coating stations. This type of conventional fabric suffers from a high damage rate as a result of tear during the molding operation of high deformation parts, therefore it cannot be considered to be a satisfactory solution to the problem.

SUMMARY OF THE INVENTION

Therefore, an object of the present invention is a non-woven fabric and a method for manufacturing same, having a thermally activated adhesive surface and capable of relatively high elongation in various directions to reduce the possibility of tearing when the fabric is being heat-sealed to a fibrous mat in a shaping mold.

Another object of the invention is to provide an improved molded fibrous mat article and a method for manufacturing same, having a heat-sealed facing fabric layer strongly bonded to a fibrous mat core, the facing fabric layer being substantially free of defects such as tears caused during the molding operation.

In one aspect, the invention provides a three-dimensional non-woven fabric having a thermally activated adhesive surface. The fabric is a laminated structure comprising a first fiber layer including bond-forming fibers which are fusible at a predetermined temperature and a second fiber layer including fibers in a solid state at said predetermined temperature. The fibers of both layers are mechanically engaged together and are arranged flatwise in bundles interconnected at junctures by protuberant fiber packings disposed in a staggered relationship throughout the fabric. The bond-forming fibers are concentrated on the fabric surface which comprises the protuberant fiber packings to form the thermally activated adhesive surface.

The non-woven fabric is particularly advantageous for use as a facing layer on a molded fibrous mat because it has a self-bonding surface, therefore obviating the need to coat the fabric with an adhesive immediately before it enters the shaping mold and also, it has good elongation or stretchability characteristics in various directions in the normal plane of the fabric which reduces the possibility of fabric tear during the molding step. The improved elongation characteristics result from the staggered pattern of fiber packings throughout the fabric which allow the fabric to be considerably stretched into the machine direction, the cross-machine direction and in intermediate directions to closely follow the topography of the fibrous mat during the shaping process thereof.

In a preferred embodiment, the fabric includes a facing layer made of polyester fibers having a relatively high melting point, of approximately 500° F. and an adhesive layer which includes low melt polyester fibers that form the bonding surface. The low melt polyester fibers are fusible at a temperature substantially below 500° F. and are intermixed with rayon fibers which act as a filler. The proportion between the rayon and the polyester fibers is preferably 50/50 however, the proportion of polyester fibers may be reduced or increased, depending on the specific application.

In a further aspect, the invention provides a method for manufacturing a non-woven fabric with a thermally activated adhesive surface, which comprises the step of feeding two continuous fiber layers in a face-to-face relationship through a fiber rearranging zone, confined therein between an apertured member having openings disposed in a staggered relationship, preferably a perforated drum, and a foraminous member, such as a screen belt. The fiber layer facing the apertured member includes bond-forming fibers which are fusible at a predetermined temperature and form the adhesive surface of the fabric. The fiber layer adjacent the foraminous member comprises fibers of a material in a solid state at the temperature at which the bond-forming fibers fuse. A fluid force is applied to the fibers in the rearranging zone, with a direction from the foraminous member toward the apertured member, causing the fibers of both layers to arrange under the influence of the fluid force flatwise in bundles extending over the land areas of the apertured member and in protruberant fiber packings located in the openings of the apertured member and interconnecting the bundles at junctures thereof. The fluid force may be created by a water stream directed across the fiber rearranging zone.

As a result of the staggered relationship between the openings in the apertured member, the protruberant fiber packings will create a staggered pattern on the fabric. As mentioned above, the staggered pattern of fiber packings improves the elongation characteristics of the fabric in various directions.

In a preferred embodiment, both fiber layers are carded in the machine direction prior to being processed in the fiber rearranging zone. The layer containing the bond forming fibers also contains filler fibers retained to the bond forming fibers by a suitable binder.

In a further aspect, the invention provides a method and an apparatus for producing a molded article including a fibrous mat on which is heat-sealed a layer of the non-woven fabric with a thermally activated adhesive surface. The irregular adhesive surface of the fabric provides a stronger and more durable bond because the fiber packings are embedded in the fibrous mat.

The method for manufacturing the molded article comprises the steps of applying the non-woven fabric to a fibrous mat and heating the fibrous mat to activate its adhesive surface in order to bond the non-woven fabric to the fibrous mat.

In a preferred embodiment, the uncured fibrous mat and the non-woven fabric are fed in adjoining relationship in a shaping mold. The mold is closed and heated to cure the fibrous mat and similtaneously seal the non-woven fabric on the mat. As a result of the higher elongation capability of the fabric in various directions, the fabric can closely follow and conform well to the topography of the fibrous mat without tearing, during the fibrous mat shaping process.

In summary, the invention comprises a three-dimensional non-woven fabric having a thermally activated adhesive surface, the non-woven fabric comprising a first fiber layer including bond-forming fibers fusible at a predetermined temperature and a second fiber layer including fibers of a material in a solid phase at the predetermined temperature, the fibers being in mechanical engagement one with another and arranged flatwise in bundles interconnected at junctures by protuberant fiber packings disposed in a staggered pattern throughout the fabric, the bond-forming fibers and the fibers of a material in a solid phase being concentrated in apex and base portions of the protuberant fiber packings respectively.

The invention further extends to a method to form a three-dimensional non-woven fabric having a thermally activated adhesive surface, the method comprising the steps of:

passing a first continuous fiber layer including bond-forming fibers fusible at a predetermined temperature and a second continuous fiber layer including fibers of a material in a solid phase at the predetermined temperature, in a face-to-face relationship through a fiber rearranging zone, confined therein between a foraminous member and an apertured member including openings arranged in a staggered relationship and spaced apart from one another by land areas, the first fiber layer facing the apertured member and the second fiber layer facing the foraminous member; and applying a fluid force to the fibers in the fiber rearranging zone with a direction from the foraminous member toward the apertured member, causing the fibers to arrange under the influence of the fluid force flatwise in bundles over the land areas, and in protuberant fiber packings in the openings interconnecting the bundles at junctures thereof, the openings arranged in a staggered relationship providing a staggered pattern of protuberant fiber packings throughout the non-woven fabric, the bond-forming fibers and the fibers of a material in a solid phase being concentrated in apex and base portions of the fiber packings respectively.

The invention also comprehends a method for manufacturing a laminated molded article, the method comprising the steps of:

providing a fibrous mat;

applying on the fibrous mat in a face-to-face relationship a non-woven fabric having a thermally activated adhesive surface which faces the fibrous mat, the non-woven fabric comprising a first fiber layer including bond-forming fibers fusible at a predetermined temperature and a second fiber layer including fibers of a material in a solid phase at the predetermined temperature, the fibers being in mechanical engagement one with another and arranged generally flatwise in bundles interconnected at junctures by protuberant fiber packings disposed in a staggered pattern throughout the fabric, the bond-forming fibers being concentrated along a surface of the non-woven fabric comprising the protuberant fiber packings, the protuberant fiber packings facing the fibrous mat; and heating the thermally activated adhesive surface at the predetermined temperature to seal the non-woven fabric to the fibrous mat.

Yet, the invention comprises a laminated molded article, comprising:

a fibrous mat core;

a facing layer of a non-woven fabric heat-sealed to the fibrous mat core, the non-woven fabric being of the type comprising a first fiber layer including bond-forming fibers fusible at a predetermined temperature and a second fiber layer including fibers of a material in a solid phase at the predetermined temperature, the fibers being in mechanical engagement one with another and arranged flatwise in bundles interconnected at junctures by protuberant fiber packings disposed in a staggered pattern throughout the fabric, the bond-forming fibers and the fibers of a material in a solid phase being concentrated in apex and base portions of the protuberant fiber packings respectively, the bond-forming fibers being fused and adhering to the fibrous mat core.

BRIEF DESCRIPTION OF THE DRAWINGS

Preferred embodiments of present invention will now be described in relation to the annexed drawings in which:

FIG. 3 is a fragmentary sectional view on an enlarged scale illustrating a nozzle assembly for producing water jets directed towards the apertured drum of the fiber rearranging station;

FIG. 4 is an enlarged fragmentary plan view of the apertured drum which diagrammatically shows the fiber rearranging process caused by the application of fluid forces on the fibers;

Referring now to FIGS. 1 to 5, there is shown the structure of a fiber rearranging station 10 of a machine for producing a three-dimensional non-woven fabric having a thermally activated irregular adhesive surface and a smooth facing layer, from fibrous webs by the application of fluid forces which rearrange the fibers into a unitary fabric structure. The concept of an apparatus for producing a foraminous fabric by applying fluid forces to a fibrous web is a well-known technique and it is described in applicant's U.S. Pat. No. 3,033,721 issued on May 8, 1962.

Figure 1:
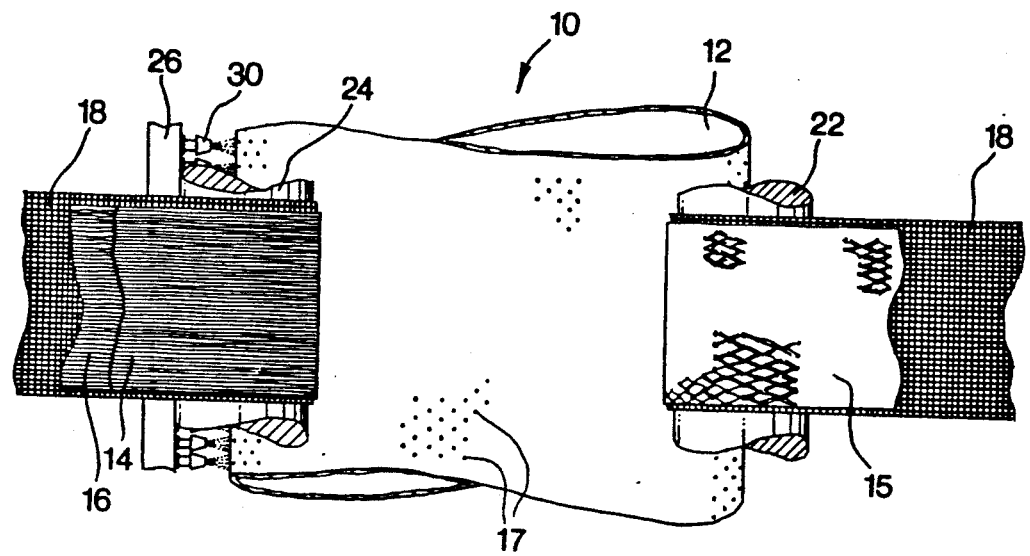
FIG. 1 is a fragmentary schematic top plan view of the fiber rearranging station of an apparatus for producing a non-woven fabric according to the invention.

The fiber rearranging station 10 comprises a rotating perforated horizontally extending drum 12 which is wrapped by two fiber layers 14 and 16 which form the irregular adhesive surface and the smooth facing surface respectively, of the non-woven fabric 15. The fiber layers 14, 16 and the resulting non-woven fabric 15 are maintained against the drum 12 by a screen belt 18 and a pair of guide rollers 22 and 24.

The structure of the perforated drum 12 is shown with more detail in FIG. 4. The drum 12 comprises perforations 17 in a staggered relationship extending on the entire peripheral surface thereof and being spaced from one another by land areas 19 which are constituted by the non-perforated drum surface. In a specific embodiment, the perforations density is 132 holes per square inch, which constitutes a 41% open area. The drum 12 is mounted for rotation to the frame of the machine for producing the fabric and it is coupled to a driving system to rotate the drum 12 in the desired direction. The drum driving system will not be described here because it is of a conventional construction.

The screen belt 18 is made of a synthetic material and has a mesh size of 23×23, defining a 55% open area. The openings on the screen belt 18 are substantially smaller than the perforations 17.

The fiber layer 14 which forms the thermally activated adhesive surface of the fabric 15 and faces the drum 12 in the fiber rearranging station 10, comprises fibers of a low melt thermoplastic material such as polyester, polyethylene and polyamide among others. As a specific example, low melt polyester fibers commercialized by Du Pont Canada Inc. under the code D1346 have been found satisfactory. The fiber layer 14 also comprises filler fibers such as rayon, acrylic, cotton, polyester and polypropylene fibers among others, bonded to the low melt thermoplastic material fibers with a suitable binder. Rayon fibers have been found particularly advantageous because of their low cost. Examples of possible binders are aqueous emulsions, acrylic binders, styrene-butadiene resins, ethylene vinyl acetates, polyvinyl chlorides, oil base emulsions and solvent base adhesives, among others. A fiber layer 14 formed entirely of low melt thermoplastic fibers can be used for specific applications, however for most applications a lower proportion of low melt thermoplastic fibers is satisfactory to achieve a strong bond and reduces the manufacturing costs of the non-woven fabric because the filler fibers are considerably less expensive than the low melt thermoplastic fibers. Preferably, the proportion of low melt thermoplastic and filler fibers is 50/50, although a lower or a higher proportion of low melt thermoplastic fibers is possible.

The fiber layer 16 which forms the facing surface of the fabric 15, faces the screen belt 18 in the fiber rearranging station 10 and comprises fibers of a material having a substantially higher melting temperature than the low melt thermoplastic material used in the adhesive layer 14 so as to remain dimensionally stable at the temperature required to fuse the adhesive surface of the non-woven fabric 15 when the fabric is being heat-sealed to another body. For example, polyester fibers of the type commercialized by Celanease Canada Inc. under the code 410 have been found satisfactory. Other types of fibers can also be used as it will be plain to those skilled in the art.

The fiber layers 14 and 16 are supplied to the fiber rearranging station 10 from respective carding machines, not-shown in the drawings, of a type well-known in the art to disentangle the raw fibers and orient them in a parallel fashion in a machine direction.

Figure 2:
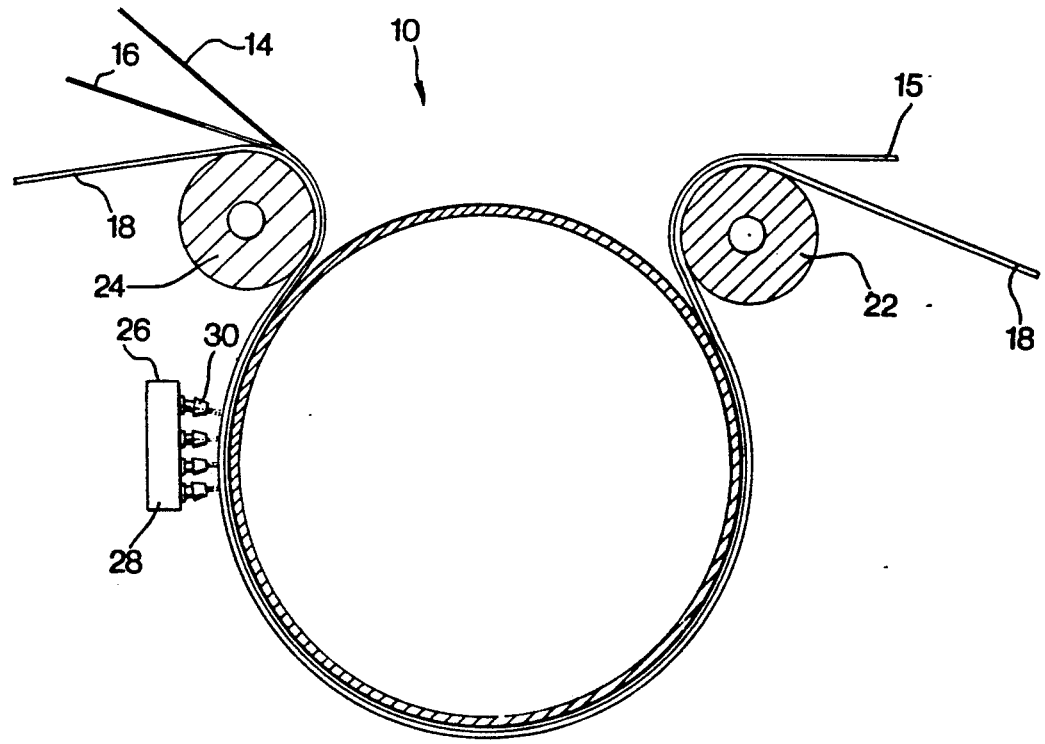
FIG. 2 is a side elevational view of the fiber rearranging station shown in FIG. 1.

A system 26 for producing a fluid stream, preferably water, to mechanically interlock the fibers of layers 14 and 16 into a foraminous fabric, is provided adjacent the perforated drum 12. The system 26 directs a fluid force to the sandwich formed by the fiber layers 14 and 16 from the screen belt 18 toward the perforated drum 12. The fluid stream producing system 26 comprises a manifold 28 connected to a source of pressurized water, from which extend four horizontal rows of nozzles 30. Each row of nozzles extends the entire length of the drum 12, and the nozzles 30 in adjacent rows are arranged in a staggered relationship. As best shown in FIGS. 1, 2 and 3, the water streams 32 produced by the individual nozzles 30 are in the form of flat cones, extending in a plane which is generally parallel to the rotation axis of the drum 12. Nozzles having a 10-15 size supplied with water at 125 psig have been successfully used.

Figure 5:
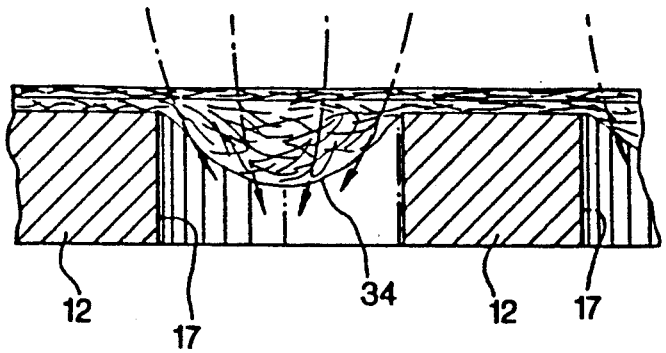
FIG. 5 is a highly enlarged sectional view taken along lines 5—5 in FIG. 4.

FIGS. 3, 4 and 5 illustrate the effect of the fluid forces on the fiber layers 14 and 16. The water projected from the nozzles 30 toward the drum 12, passes through the screen belt 18 which acts as a spray diffusing member to break down large water droplets into smaller droplets which then carry the fibers in the perforations 17 of the drum 12 where they become mechanically interlocked forming protuberant packings which are joined by flat fiber bundles extending over the land areas 19 of the drum 12.

Figure 6:
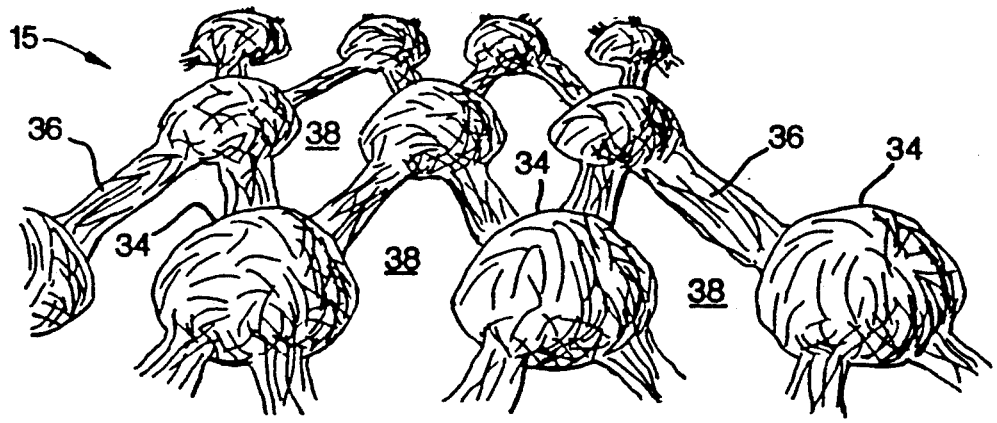
FIG. 6 is a perspective view on a highly enlarged scale of the structure of the non-woven fabric according to the invention, the adhesive surface of the fabric facing up.
Figure 7:
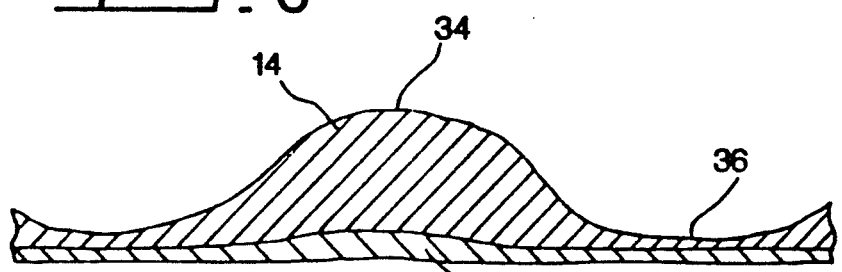
FIG. 7 is a diagrammatic vertical sectional view on a highly enlarged scale of a single fiber packing of the fabric shown in FIG. 6, illustrating the distribution of the various type of fibers therein.

The structure of the resulting fiber network is more clearly shown in FIG. 6. The fabric 15 comprises an irregular adhesive surface, shown facing up in FIG. 6, which displays parallel rows of fiber packings 34 having a generally convex surface, arranged in a staggered relationship and interconnected by bundles of fibers 36. In the bundles 36, the fibers are generally parallel to one another and arranged flatwise. The network of fiber packings 34 and bundles 36 define diamond shaped zones 38 which are substantially free of fibers. It has been observed that this fabric structure allows a higher fabric elongation in various directions in the normal plane of the fabric such as the machine direction, the cross-machine direction and other intermediate directions, before permanent damage to the fabric occurs. FIG. 7 illustrates schematically the disposition of the fiber layers 14 and 16 in the resultant laminated fabric network. The irregular surface of the fabric constituted by the fiber packings 34 is formed by the fibers of the fibrous layer 14 while the opposite surface of the fabric is constituted by the fibers of layer 16.

It will be appreciated that the disposition of the fiber packings 34 in the fabric 15 essentially depends on the perforation pattern on the drum 12. If it is desired to produce a fabric where the packings 34 extend more closely to one another, or more distant from one another, it suffices to provide a drum 12 having the corresponding perforation scheme.

Tests have been conducted to measure the elongation at break of the non-woven fabric according to the invention, comparatively to a prior art non-woven fabric. The results of these tests, summarized in the table below, clearly demonstrate the improvement in the elongation characteristics of the fabric as a result of the staggered pattern of fiber packings throughout the fabric.

|  | Prior art fabric | Fabric according to invention |
| --- | --- | --- |
| Composition | Polyester (melting temperature) of about 500° F.) Binder | Polyester (melting temperature of about 500° F.) Low melt polyester Rayon Binder |
| Structure | Fibers carded in machine direction | Staggered pattern of protuberant fiber packings |
| Basis weight g/yr$^2$ | 27.3 | 26.8 |
| Average of elongation at break in cross machine direction 6 folds/1 inch | 112.4 | 113.3 (+0.8%) |
| Average of elongation at break in machine direction 6 folds/1 inch | 20.5 | 25.2 (+22.9%) |
| Average of elongation at bias direction (45°) 6 folds/1 inch | 29.3 | 47.1 (+60.8%) |

The non-woven fabric 15 may be subjected to various well-known chemical or mechanical treatments such as printing, creping, fluffing and coating with a fire-retardant component, among others, to provide the fabric with the desired properties to suit various applications.

Figure 8:
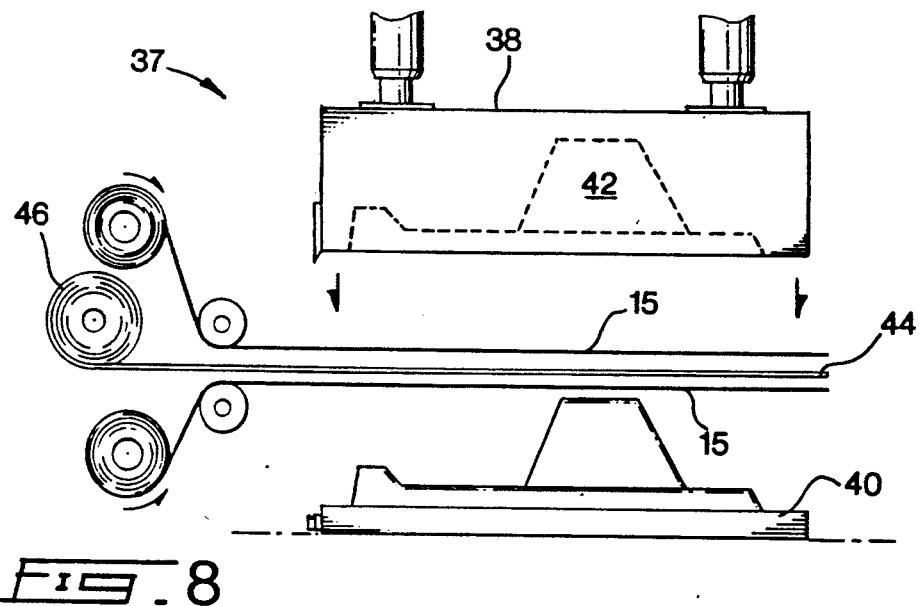
FIG. 8 is a schematical view of a process and an apparatus for manufacturing a molded fibrous mat article provided with the non-woven fabric according to the present invention as a facing layer.
Figure 9:
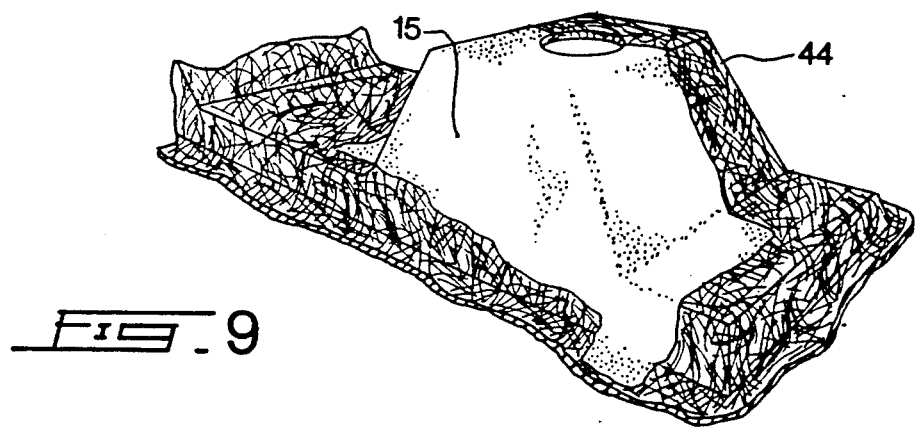
FIG. 9 is a perspective view of the molded fibrous mat article produced with the apparatus shown in FIG. 8, the non-woven fabric facing layer being partly removed for clarity.

The non-woven fabric 15 is well suited for use as a facing layer of a fibrous mat article. FIG. 8 illustrates an automated molding station 37 for shaping and curing a fibrous mat sheet and for simultaneously heat-sealing thereon layers of the non-woven fabric 15. The molding station 37 comprises mold halves 38 and 40 which are movable one relatively to another, and defining in a closed position a molding cavity 42. An uncured sheet of glass fibers mat 44 is fed from a supply roll 46 between two sheets of non-woven facing fabric 15 arranged so that the bonding surface of each fabric faces the glass fibers mat 44. When the sandwich constituted by the uncured mat 44 and the two sheets of fabric 15 is extended between the mold halves, the mold is closed to press together the sandwich layers and heated by any appropriate means to cure and shape the glass fibers mat and to activate the bonding surface of the sheets of fabric 15 so that the fabric is heat-sealed on the mat. As a result of the good elongation characteristics of the fabric 15, it can closely follow the topography of the mat 44, as it is elongated to assume the shape of the molding cavity 42 without tearing. FIG. 9 illustrates the resulting molded article.

Figure 10:
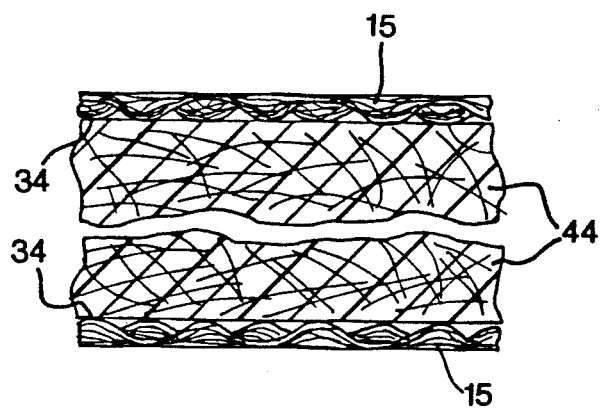
FIG. 10 is a fragmentary and enlarged cross-sectional view of the molded article shown in FIG. 9, illustrating the laminated structure formed by the fibrous mat core and the facing fabric layers.

FIG. 10 illustrates in detail the laminated structure by the glass fibers mat and the two non-woven fabric facing layers. The protruberant fiber packings 34 are fused and embedded in the fibrous mat core under the effect of heat and pressure in the mold which results into a stronger bond between the two surfaces.

The irregular adhesive surface of the fabric 15 is also advantageous because it constitutes an anti-friction surface which assists in properly positioning the fabric sheet over the mat core prior to the heat-sealing of the fabric thereon. The protuberant packings 34 grip the fibrous surface of the mat which prevents slipping or misalignment of the fabric from the mat core prior to bonding of the fabric to the mat.

It will be appreciated that the non-woven fabric 15 does not necessarily have to be heat-sealed to the fibrous mat core during the shaping process of the fibrous mat. It may very well be envisaged to cure the non-woven fabric to the fibrous mat core before or after the shaping process thereof. Such an embodiment may be well-suited for applications where the required temperatures for heat-sealing the non-woven fabric and for curing the fibrous mat are different.

The above description of preferred embodiments according to the invention should not be interpreted in any limiting manner as they may be varied and refined in various ways. The scope of the invention is defined in the annexed claims.

What is claimed is:

1. A three-dimensional non-woven fabric having a thermally activated adhesive surface, said non-woven fabric comprising a first fiber layer including bond-forming fibers fusible at a predetermined temperature and a second fiber layer including fibers of a material in a solid phase at said predetermined temperature, said fibers being in mechanical engagement one with another and arranged flatwise in bundles interconnected at junctures by protuberant fiber packings disposed in a staggered pattern throughout said fabric, said bond-forming fibers and said fibers of a material in a solid phase being concentrated in apex and base portions of said protuberant fiber packings respectively.

2. A three-dimensional non-woven fabric as defined in claim 1, wherein said staggered pattern constitutes means to increase stretchability of said non-woven fabric in various directions in a plane of said non-woven fabric.

3. A three-dimensional non-woven fabric as defined in claim 1, wherein said bundles and said fiber packings define a pattern of diamond shaped zones substantially free of fibers.

4. A three-dimensional non-woven fabric as defined in claim 1, wherein said first fiber layer further includes filler fibers.

5. A three-dimensional non-woven fabric as defined in claim 4, wherein said filler and bond-forming fibers are bonded together with a binder.

6. A three-dimensional non-woven fabric as defined in claim 1, wherein said bond-forming fibers are made of a low temperature melt thermoplastic material.

7. A three-dimensional non-woven fabric as defined in claim 6, wherein said bond-forming fibers are made of a material selected from the group consisting of polyester, polyethylene and polyamide.

8. A three-dimensional non-woven fabric as defined in claim 4, wherein said filler fibers are made of a material selected in from group consisting of rayon, acrylic material, cotton, polyester and polypropylene.

9. A three-dimensional non-woven fabric as defined in claim 5, wherein said binder is selected from the group consisting of aqueous emulsion, acrylic binder, styrene-butadiene resin, ethylene vinyl acetate, polyvinyl chloride, oil base emulsion and solvent base adhesive.

10. A three-dimensional non-woven fabric as defined in claim 4, wherein said first fiber layer includes approximately 50% of rayon fibers and approximately 50% of low temperature melt polyester fibers.

11. A three-dimensional non-woven fabric as defined in claim 1, wherein said material is polyester.

* * * * *